United States Patent
Poirier et al.

(10) Patent No.: US 7,845,243 B2
(45) Date of Patent: Dec. 7, 2010

(54) TORQUE SENSOR ASSEMBLY

(75) Inventors: Norman Poirier, Raynham, MA (US);
Daniel Nachtigal, Jamaica Plain, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 11/719,005

(22) PCT Filed: Nov. 14, 2005

(86) PCT No.: PCT/US2005/041000
§ 371 (c)(1),
(2), (4) Date: Apr. 1, 2008

(87) PCT Pub. No.: WO2006/053244
PCT Pub. Date: May 18, 2006

(65) Prior Publication Data
US 2008/0257069 A1  Oct. 23, 2008

Related U.S. Application Data

(60) Provisional application No. 60/627,337, filed on Nov. 12, 2004.

(51) Int. Cl.
*G01L 3/02* (2006.01)
(52) U.S. Cl. .................................. 73/862.191
(58) Field of Classification Search ...............................
73/862.331–862.333, 862.191
See application file for complete search history.

(56) References Cited

U.S. PATENT DOCUMENTS

| | | | |
|---|---|---|---|
| 4,993,267 A * | 2/1991 | Allard et al. .................. 73/726 |
| 5,195,377 A | 3/1993 | Garshelis | |
| 5,269,192 A * | 12/1993 | Utsui et al. ............. 73/862.335 |
| 5,501,110 A * | 3/1996 | Peilloud et al. ......... 73/862.321 |
| 5,731,529 A * | 3/1998 | Nicot .................... 73/862.326 |
| 2002/0029642 A1* | 3/2002 | Soejima et al. .......... 73/862.08 |
| 2004/0154412 A1* | 8/2004 | Viola et al. ............. 73/862.331 |
| 2006/0169062 A1* | 8/2006 | Varonis ................ 73/862.333 |

OTHER PUBLICATIONS

International Search Report and Written Opinion mailed Jan. 8, 2007 issued in corresponding PCT Application No. PCT/US05/14000.

* cited by examiner

*Primary Examiner*—Max Noori
(74) *Attorney, Agent, or Firm*—Grossman, Tucker, Perreault & Pfleger, PLLC

(57) ABSTRACT

A torque sensing assembly (10) includes a first sensor assembly (50) configured for sensing at least a portion of a magnetic field of a first portion (22) of a rotating shaft assembly (12) and generating a first signal (52). A second sensor assembly (56) is configured for sensing at least a portion of a magnetic field of a second portion (26) of the rotating shaft assembly (12) and generating a second signal (58). A common mode detection circuit (54) is configured for combining the first and second signals to form a combined signal and processing the combined signal to at least partially remove a common mode signal from the combined signal and generate an output signal.

20 Claims, 17 Drawing Sheets

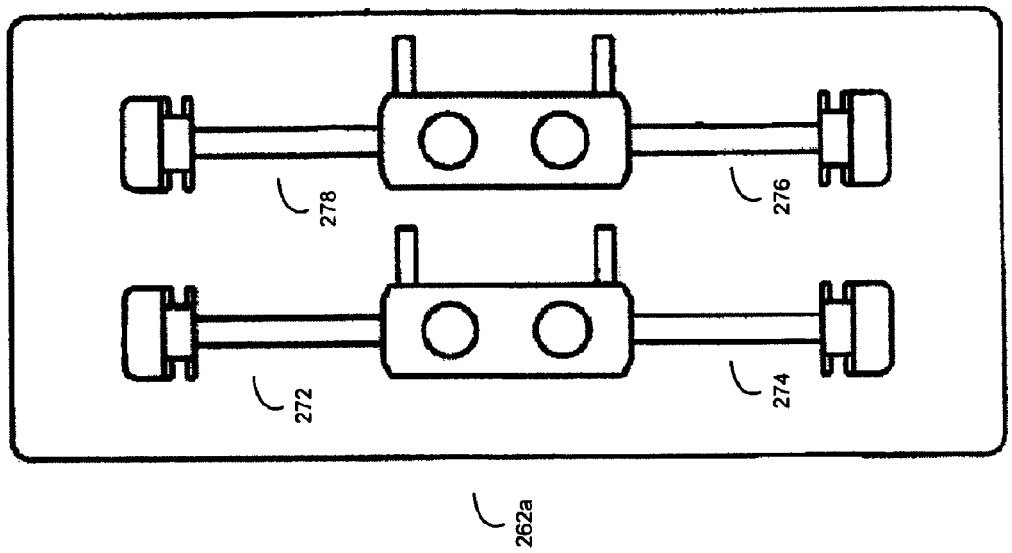
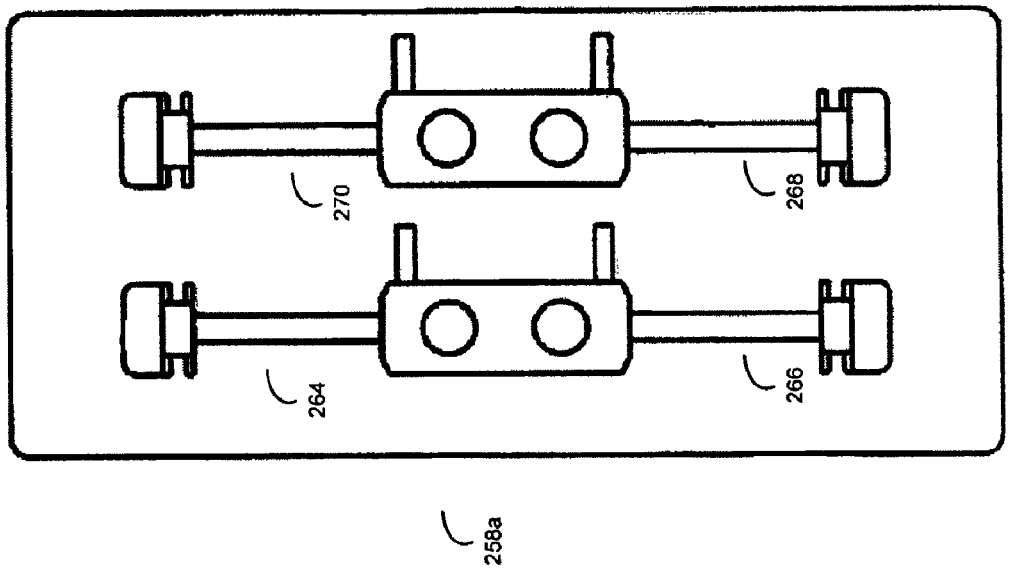
FIG. 10

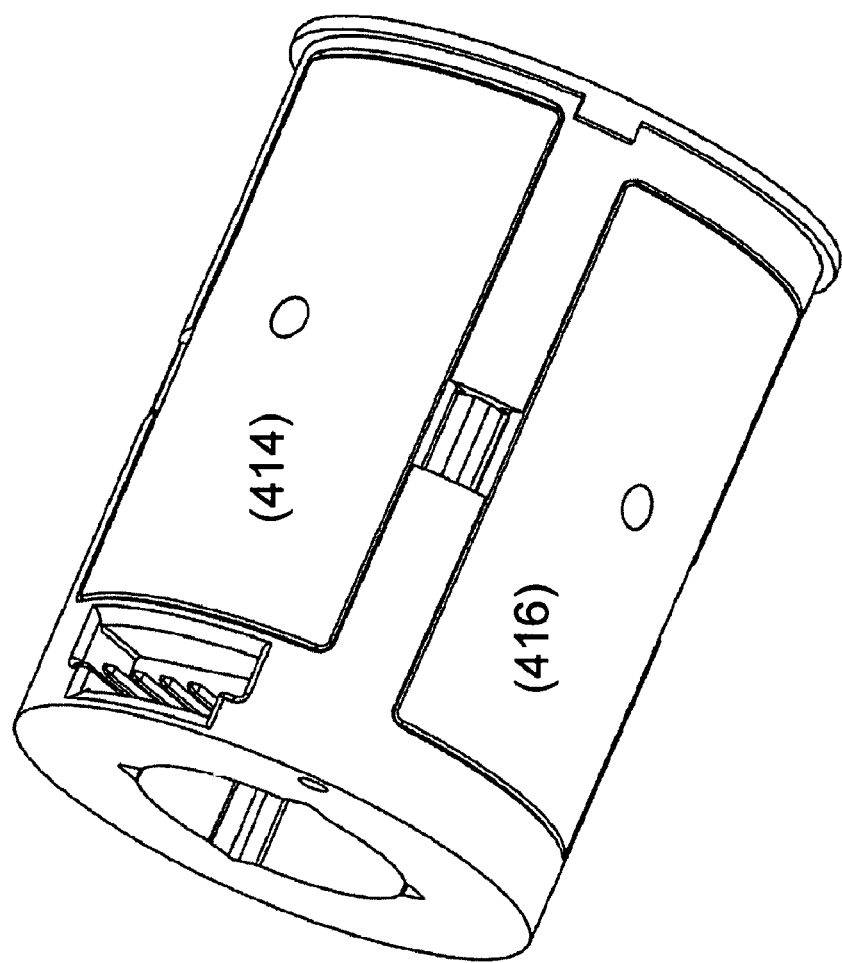

TORQUE SENSOR ASSEMBLY

RELATED APPLICATIONS

This application claims the benefit of the U.S. filing date of the following application, which is herein incorporated by reference: U.S. Provisional Application Ser. No. 60/627,337 entitled, "Torque Sensor", filed 12 Nov. 2004.

FIELD OF THE DISCLOSURE

This disclosure relates to torque sensors and, more particularly, to non-contact torque sensors including one or more flux gate sensors.

BACKGROUND

In control systems having rotating shafts, shaft speed and applied torque are often monitored. Initially, when measuring torque on a rotating shaft, one or more "strain gauge" type sensors were physically attached to the surface of the shaft. By monitoring the resistance of the stain gauges, the torque applied to the shaft may be determined. Unfortunately, "strain gauge" type sensors proved to be relatively unstable and unreliable.

Subsequently, non-contact type torque sensors were developed for measuring torque on rotating shafts having a plurality of oppositely-magnetized, circumferential regions. Typically, under a torque load, torsional twisting of the rotating shaft occurs, resulting in the normally circumferential lines of magnetic flux (present on the rotating shaft) becoming increasingly helical as the torque load is increased. Accordingly, by measuring the axial component of the magnetic field of the rotating shaft, the torque experienced by the rotating shaft may be measured.

BRIEF DESCRIPTION OF THE DRAWINGS

FIG. 10 is a diagrammatic view of one exemplary arrangement of sensor elements for use within the housing assembly of FIG. 9;

FIG. 17 is an isometric view of the alternative embodiment housing assembly of FIG. 13.

DETAILED DESCRIPTION

Figure 1:
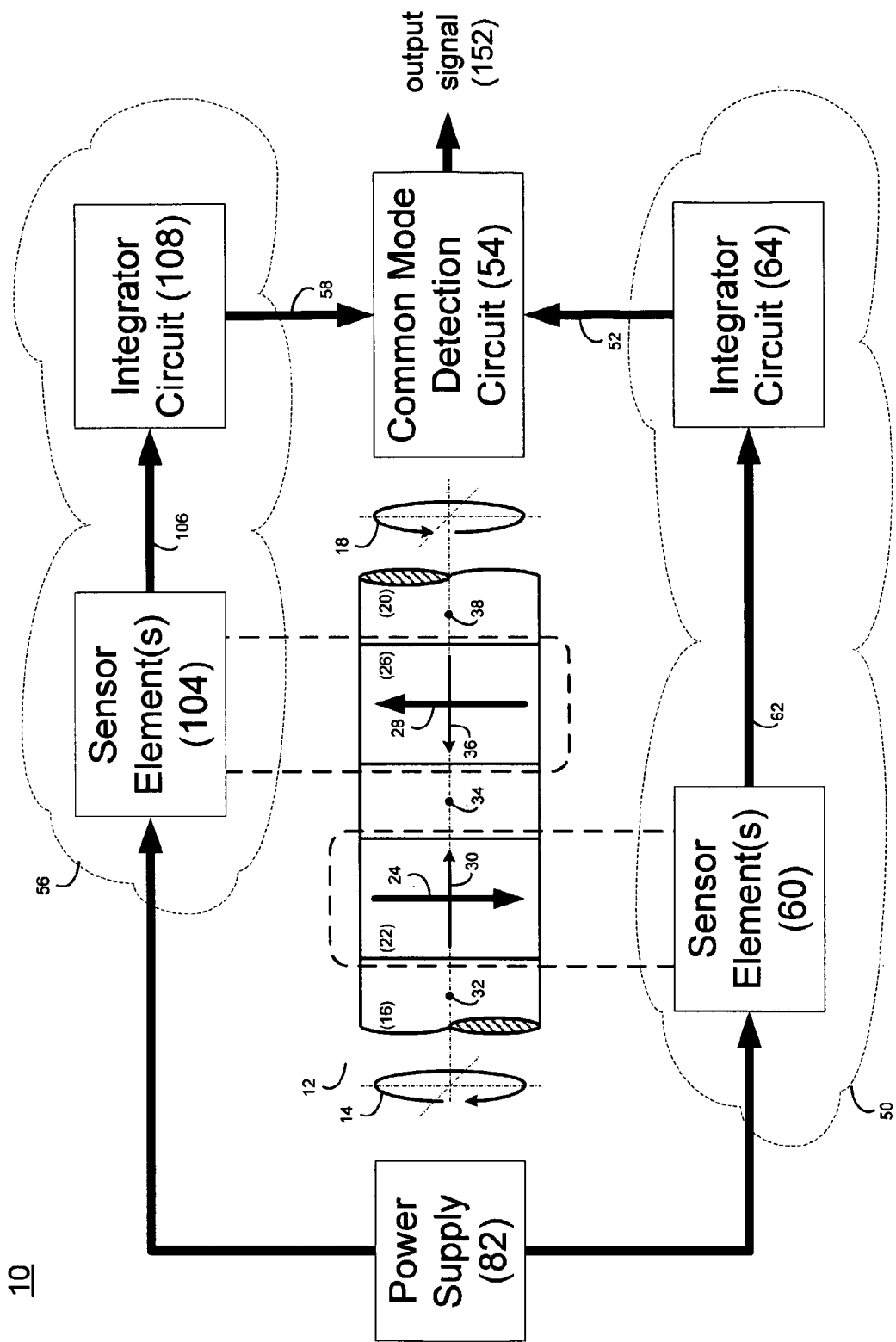
FIG. 1 is a diagrammatic view of a torque sensor assembly including a first sensor assembly, a second sensor assembly, a common mode detection circuit, and a power supply.

Referring to FIG. 1, there is shown a torque sensor assembly 10 that may be used to monitor the torque load experienced by a rotating shaft assembly 12. During use of rotating shaft assembly 12, a rotating force 14 may be applied to a first end 16 of rotating shaft assembly 12. Rotating force 14 may be applied by e.g., an electric motor. Further, a resistive force 18 (i.e., a force that resists rotating force 14) may be applied to a second end 20 of rotating shaft assembly 12. Resistive force 18 may be the result of a resistive load applied by a machine coupled to the second end 20 of rotating shaft assembly 12.

For example, rotating shaft assembly 12 may be a PTO (i.e., Power Take Off) shaft assembly of an agricultural tractor (not shown) and rotating force 14 may be supplied by a diesel motor (not shown) powering the tractor. Resistive force 18 may be supplied by an implement attached to the PTO shaft assembly. An example of such an implement is a power auger assembly (not shown). Assuming that rotating force 14 is greater than resistive force 18, rotating shaft assembly 12 will rotate in the direction of rotating force 14.

In addition to rotating, rotating shaft assembly 12 will torsionally twist in response to the torque load experience by rotating shaft assembly 12. While the amount of torsional twist will vary based on a plurality of factors (e.g., the diameter of shaft assembly 12, and the elasticity of the material from which shaft assembly 12 is constructed, for example), the torsional twisting experienced by shaft assembly 12 is minimized when the torque load is minimized, and the torsional twisting experienced by shaft assembly 12 is maximized when the torque load is maximized. For example, when resistive force 18 is zero, the torque experience by shaft assembly 12 is also zero (i.e., assuming negligible mechanical resistance). However, when resistive force 18 is greater than or equal to rotating force 14, shaft assembly 12 will not rotate and the torque experienced is maximized (as is the torsional twisting of shaft assembly 12).

Accordingly, by monitoring the level of torsional twisting of shaft assembly 12, the torque experienced by shaft assembly 12 may also be monitored. In order to facilitate the monitoring of torque experienced by shaft assembly 12, various portions of shaft assembly 12 may be magnetized. For example, a first portion 22 of shaft assembly 12 may be magnetically polarized in a first circumferential direction (e.g., direction 24), while a second portion 26 of shaft assembly 12 may be magnetically polarized in a second circumferential direction (e.g., direction 28).

As is known in the art, the directional magnetization of various portions of shaft assembly 12 may be accomplished in various ways. For example, by allowing a current signal 30 to pass through shaft assembly 12 from point 32 to point 34, portion 22 of shaft assembly 12 may be magnetized in the first circumferential direction 24. Further, by allowing a current signal 36 to pass through shaft assembly 12 from point 38 to point 34, portion 26 of shaft assembly 12 may be magnetized in the second circumferential direction 28. Examples of the manner in which various portions of shaft assembly 12 may be directionally magnetized are disclosed in U.S. Pat. No. 6,260,423, entitled "Collarless Circularly Magnetized Torque Transducer and Method for Measuring Torque using Same", and issued on 17 Jul. 2001, which is herein incorporated by reference.

As is known in the art when shaft assembly 12 experiences a torque load and torsionally twists, the circumferential magnetic polarization directions 24, 28 of portions 22, 26 (respectively) are skewed in the axial (i.e., x-axis) direction. Accordingly, by monitoring the axial (i.e., x-axis) component of the magnetic field present in e.g., portions 22, 26 of shaft assembly 12, the level of torsional twisting (and therefore, the torque load) experienced by shaft assembly 12 may be determined.

Referring again to FIG. 1, torque sensor assembly 10 may include a first sensor assembly 50 configured to sense at least a portion of a magnetic field of portion 22 of rotating shaft assembly 12 and generate a first signal 52, which is provided to common mode detection circuit 54. Torque sensor assembly 10 may further include a second sensor assembly 56 configured to sense at least a portion of a magnetic field of portion 26 of rotating shaft assembly 12 and generate a second signal 58 that is provided to common mode detection circuit 54.

Figure 2:
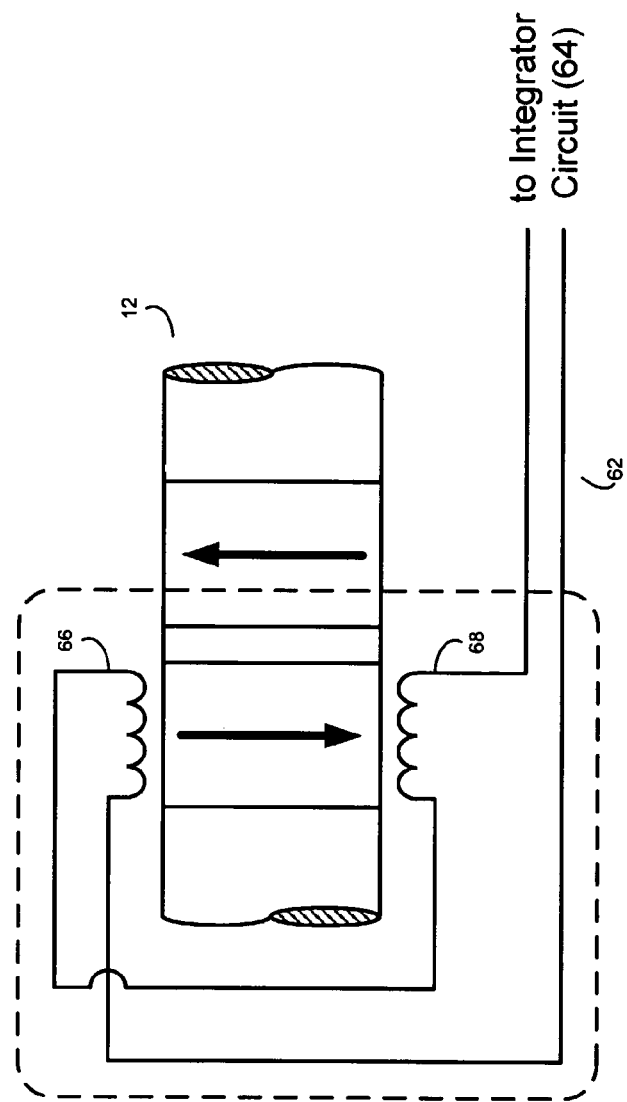
FIG. 2 is a schematic diagram of a sensor element of the first sensor assembly of FIG. 1.

First sensor assembly 50 may include one or more sensor elements 60 for generating a first magnetic intensity signal 62 and an integrator circuit 64 for processing first magnetic intensity signal 62 to generate first signal 52. Referring also to FIG. 2, sensor elements 60 may include a first sensor element 66 coupled in a series configuration, e.g. in differential summation mode, to a second sensor element 68. The first and second sensor elements 66, 68 may be radially diametrically-opposed about rotating shaft 12. Alternatively, the sensor elements 66, 68 may be offset circumferentially by 90°. Other angular offsets may be also be employed.

One or both of sensor elements 66, 68 may be a flux gate, Hall Effect device, or other sensor element configured for providing an output in response to a magnetic field. Selection of the specific configuration for the sensor element may depend upon the application. In a torque sensing application, flux gate sensor may be used to provide sensitive field measurements (e.g., the magnetic fields of portions 22, 26 of shaft assembly 12, for example) with relatively linear output and at extreme temperatures. A variety of flux gate configurations are well-known to those of ordinary skill in the art. In general a flux gate allows field measurements by exhibiting an asymmetry in the ease of saturating a core using AC current in the presence of an external magnetic field. Flux gates may be provided in single or multiple coil configurations. As is known, a single coil flux gate may include only a single winding wound around a molded core including a sliver of magnetic material imbedded therein. An AC drive current may be applied to the coil, e.g. by a power supply as described below. A single coil flux may provide a simple and cost-effective configuration. A multiple coil flux gate may include a magnetically-permeable core assembly, a drive coil, and a sense coil. As is known, a comparison may be made concerning the drive coil current needed to saturate core in one direction, versus the drive coil current needed to saturate core in the other direction.

Figure 3:
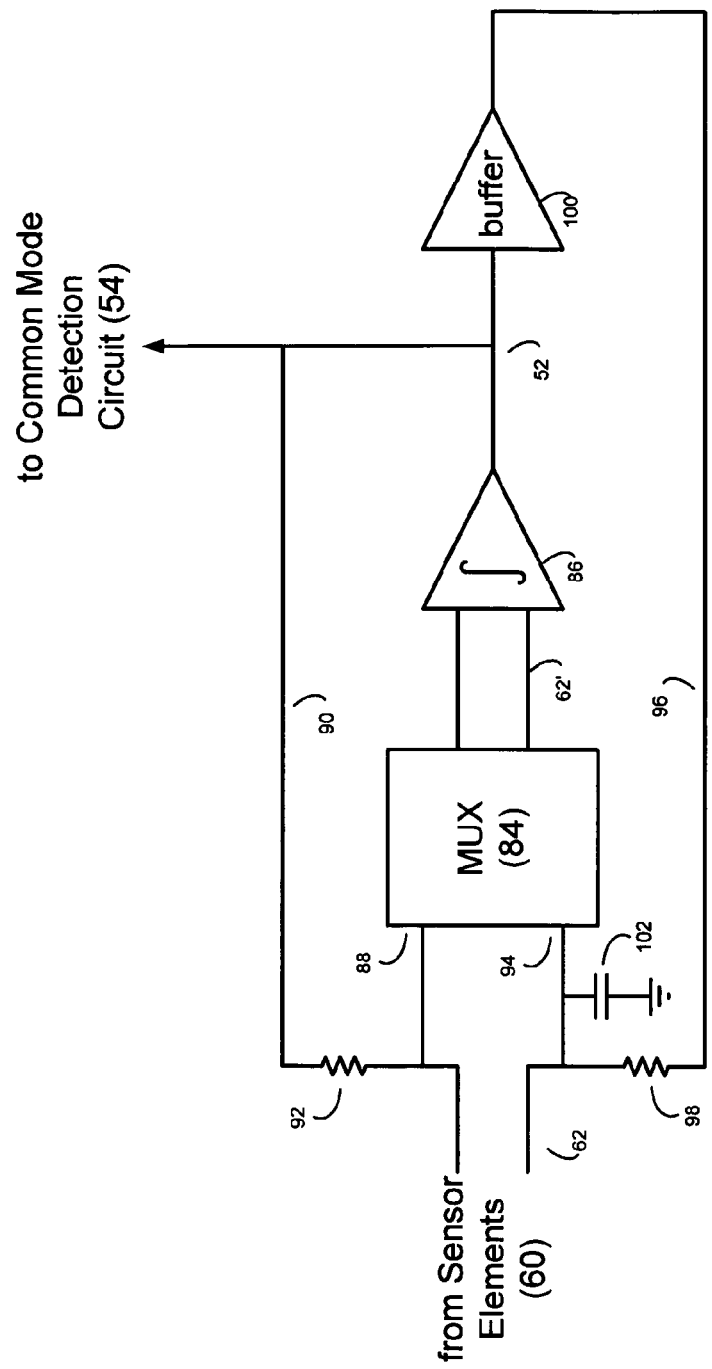
FIG. 3 is a schematic diagram of an integrator circuit of the first sensor assembly of FIG. 1.

Referring also to FIG. 3, integrator circuit 64 may include a rectifying circuit 84 for rectifying first magnetic intensity signal 62. Rectifying circuit 82 may include a multiplexer. Rectified magnetic intensity signal 62' may be provided to integrator 86, which integrates rectified magnetic intensity signal 62' to generate first signal 52.

As discussed above, first signal 52 may be provided to common mode detection circuit 54. Additionally, first signal 52 may be provided to a first terminal 88 of rectifying circuit 84 via a first feedback path 90 that may include resistive device 92. An example of resistive device 92 is a resistor. Further, first signal 52 may be provided to a second terminal 94 of rectifying circuit 84 via a second feedback path 96 that may include resistive device 98 and buffer circuit 100. Integrator circuit 64 may include filtering device 102 for attenuating high frequencies applied to second terminal 94 of rectifying circuit 84 by shunting second terminal 94 to ground. An example of such a filtering device 102 is capacitor.

Referring again to FIG. 1, second sensor assembly 56 may include one or more sensor elements 104 for generating a second magnetic intensity signal 106 and an integrator circuit 108 for processing second magnetic intensity signal 106 to generate second signal 58.

Figure 4:
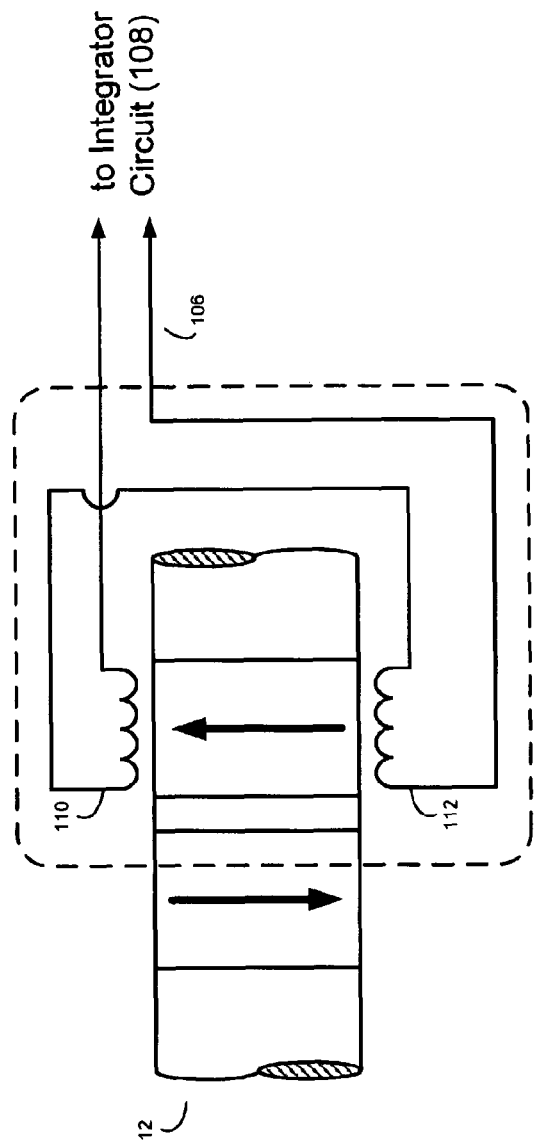
FIG. 4 is a schematic diagram of a sensor element of the second sensor assembly of FIG. 1.

Referring also to FIG. 4, sensor elements 104 may include a first sensor element 110 coupled in a series configuration, e.g. in differential summation mode, to a second sensor element 112. As described above with regard to sensor elements 66, 68, one or both of sensor elements 110, 112 may be a flux gate, Hall Effect device, or other sensor element configured for providing an output in response to a magnetic field. The first and second sensor elements 110, 112 may be radially diametrically-opposed about rotating shaft 12. Alternatively, the sensor elements 110,112 may be offset circumferentially by 90°, and may be offset from the sensor elements 66,68 by 90°, to provide two pairs of coils that are uniformly spaced around the shaft, i.e. four coils evenly spaced 90° from each other. This configuration may allow signal averaging to account for any variance in positioning of the shaft relative to the sensor elements. Other angular offsets may be also be employed.

Figure 5:
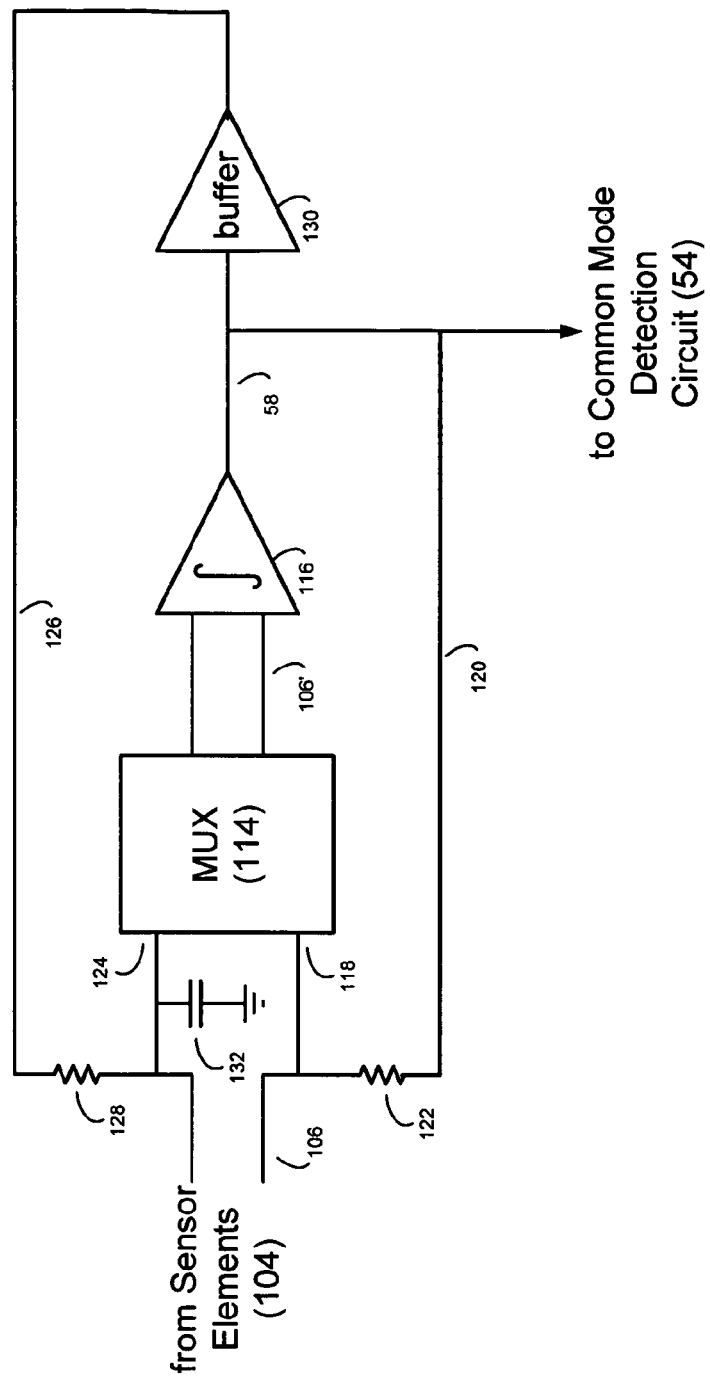
FIG. 5 is a schematic diagram of an integrator circuit of the second sensor assembly of FIG. 1.

Referring also to FIG. 5, integrator circuit 108 may include a rectifying circuit 114 for rectifying second magnetic intensity signal 106. Rectifying circuit 114 may include a multiplexer. Rectified magnetic intensity signal 106' may be provided to integrator 116, which integrates rectified magnetic intensity signal 106' to generate second signal 58.

As discussed above, second signal 58 may be provided to common mode detection circuit 54. Additionally, second signal 58 may be provided to a first terminal 118 of rectifying circuit 114 via a first feedback path 120 that may include resistive device 122. An example of resistive device 122 is a resistor. Further, second signal 58 may be provided to a second terminal 124 of rectifying circuit 114 via a second feedback path 126 that may include resistive device 128 and buffer circuit 130. Integrator circuit 108 may include filtering device 132 for attenuating high frequencies applied to second terminal 124 of rectifying circuit 114 by shunting second terminal 124 to ground. An example of such a filtering device 132 is a capacitor.

Figure 6:
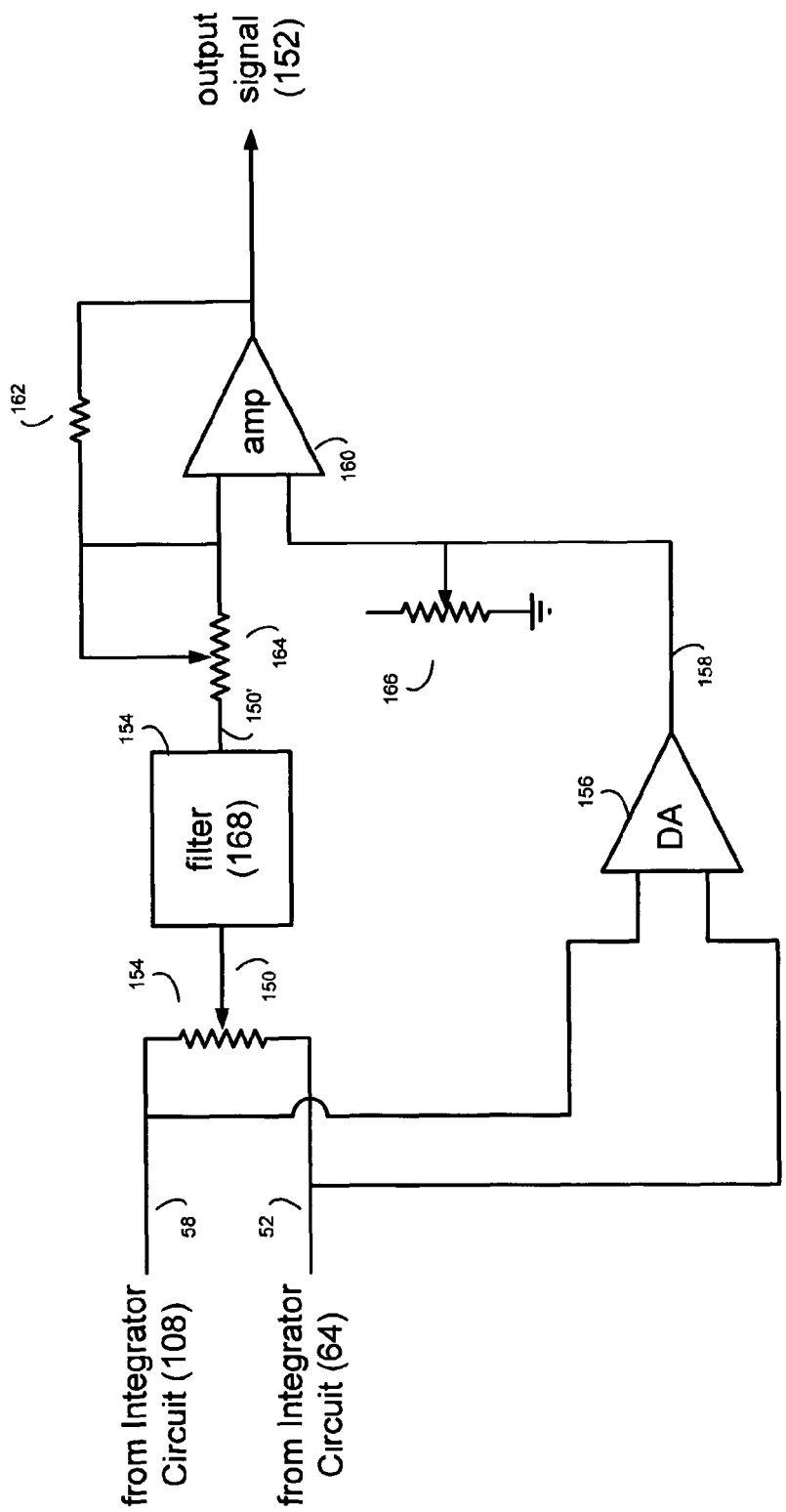
FIG. 6 is a schematic diagram of the common mode detection circuit of FIG. 1.

Referring also to FIG. 6, common mode detection circuit 54 may be configured to combine first and second signals 52, 58 (received from integrator circuits 64, 108 respectively) to form combined signal 150. Combined signal 150 may be processed to at least partially remove a common mode signal from the combined signal 150 and to generate output signal 152.

Common mode rejection circuit 54 may include a balancing circuit 154 for balancing first signal 52 with respect to second signal 54 and generating combined signal 150. An example of balancing circuit 154 includes potentiometer. A differential amplification circuit 156, which may be responsive to first and second signals 52, 58, may generate differential signal 158. An output amplification circuit 160, which may be responsive to combined signal 150 and differential signal 158, may amplify combined signal 150 to generate output signal 152.

The gain of output amplification circuit 160 may be controlled by the ratio of resistance device 162 versus the resistance device 164. For example, if output amplification circuit 160 is configured as a standard inverting op-amp amplifier, the gain of output amplification circuit 160 may be equal to the value of resistance device 162 divided by the value of resistance device 164. Additionally/alternatively, resistance device 164 may be a potentiometer, thus allowing for the gain of output amplification circuit 160 to be fine tuned.

Common mode rejection circuit 54 may further include an offset adjustment circuit 166 for adjusting the "zero torque" value of output signal 152. An example of such an offset adjustment circuit 166 is a potentiometer. Common mode rejection circuit 54 may further include a filter circuit 168 for filtering combined signal 150 to generate filtered combined signal 150', which is provided to output amplification circuit 160. An example of filter circuit 168 includes a five-pole, low-pass filter.

Figure 7:
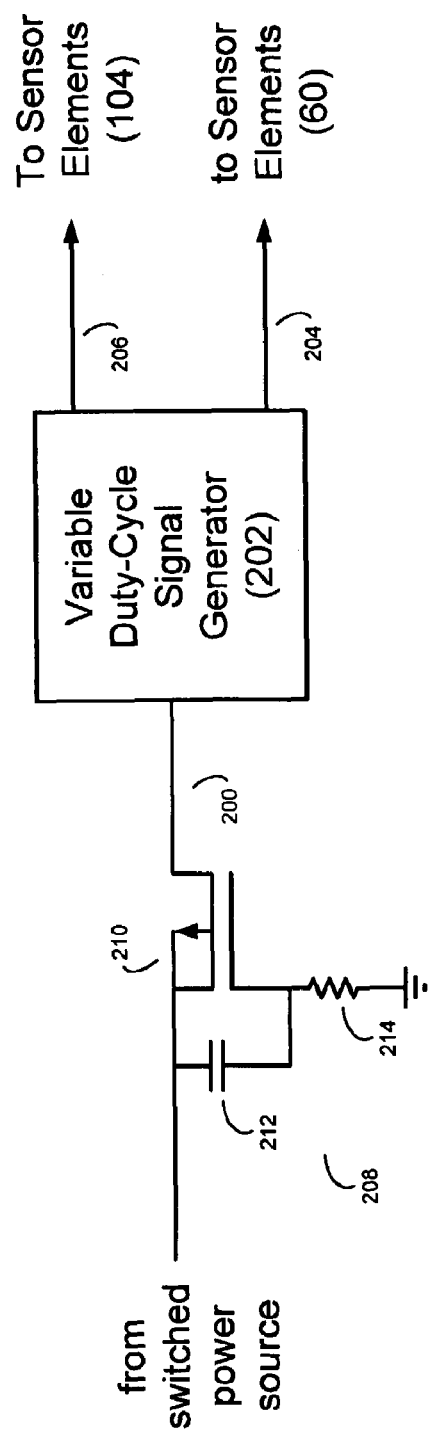
FIG. 7 is a diagrammatic view of the power supply of FIG. 1.

Referring also to FIG. 7, power supply 82 may be configured to provide a power signal to sensor assemblies 60, 104. Power supply 82 may include a variable duty-cycle signal generator 202 for providing power signals 204, 206 to sensor elements 60, 104 (respectively). The variable duty-cycle signal generator 202 may be configured, in a known manner, to provide a variable-duty cycle square-wave (or other wave shape) output. A soft-start controller 208 may be configured to slowly energize variable duty-cycle signal generator 202 during a defined time period, thus reducing the instantaneous current requirements during the initial startup of torque sensor assembly 10.

The duration of the defined period of time may be controlled by adjusting the RC time constant of soft-start controller 208. A typical example of soft-start controller 204 may include transistor 210, capacitor 212 and resistive device 214. For example, transistor 210 may be configured to conduct (i.e., be on) when a voltage signal is not applied to the gate of transistor 210. Accordingly, when a switched power source (not shown) applies a power signal to soft-start controller 208, due to the initial transient nature of the power signal, the majority of the potential of the power signal appears across resistive device 214 (as capacitor 212 has a very low impedance at high frequencies). Accordingly, as the potential across resistive device 214 is applied to the gate of transistor 210, transistor 210 is turned off and, therefore, the power signal does not reach variable duty-cycle square-wave generator 202. However, as the power signal stabilizes and eventually becomes a DC signal, the impedance of capacitor 212 increases and, therefore, the potential across resistive device 214 is greatly reduced. This is turn lowers the signal applied to the gate of transistor 210, resulting in transistor 210 turning on and the power signal being applied to variable duty-cycle square-wave generator 202. As discussed above, the rate at which transistor 210 transitions from an "off" state to an "on" state may be controlled by adjusting the RC time constant defined by capacitor 212 and resistive device 214.

Figure 8:
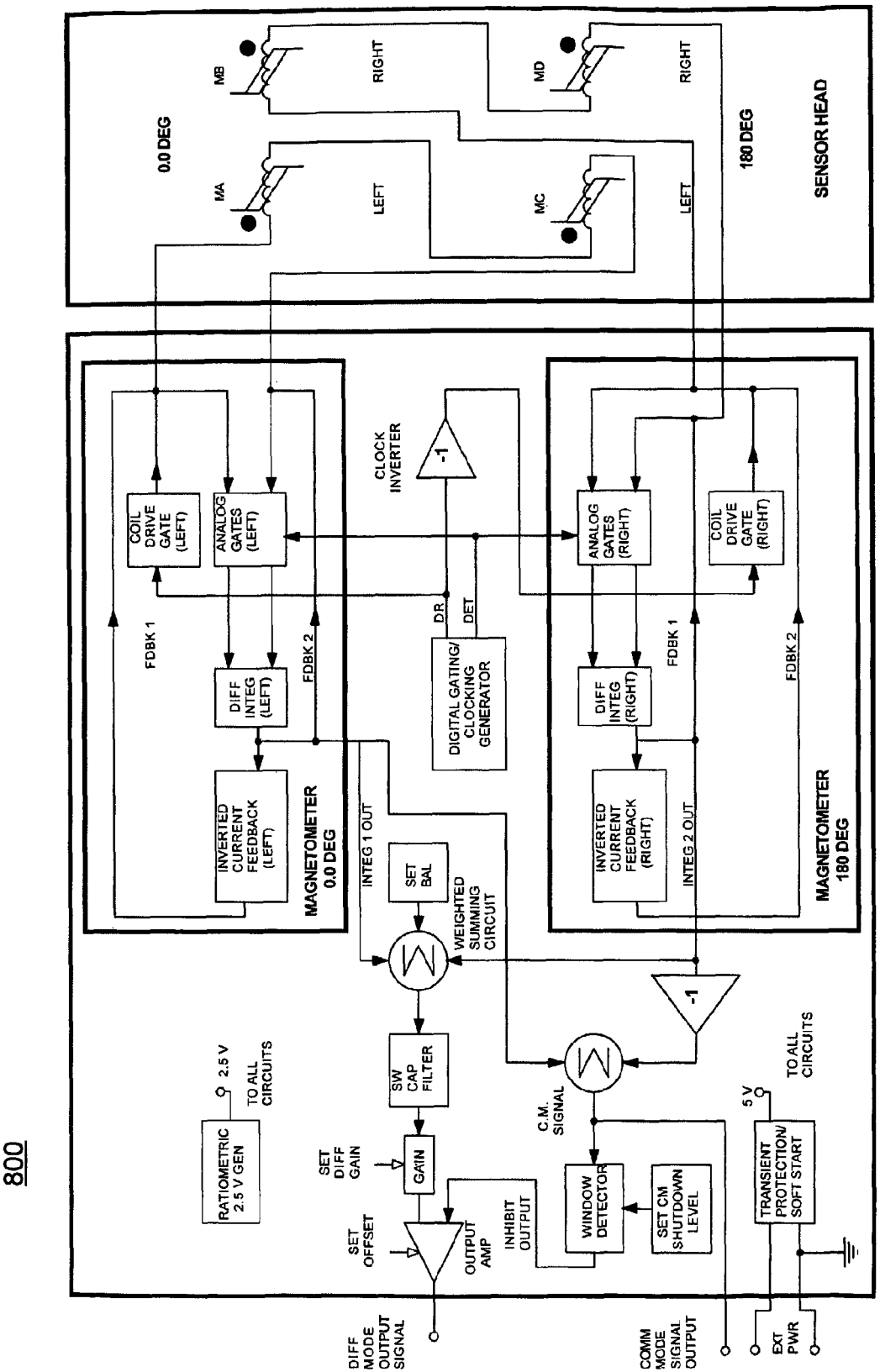
FIG. 8 illustrates, in block diagram form, another exemplary embodiment of a torque sensor assembly.

FIG. 8 illustrates, in block diagram form, another exemplary embodiment 800 of a torque sensor assembly. The illustrated exemplary embodiment includes first and second flux gate coil pairs, with the flux gates of each pair combined in differential summation mode, and 0 and 180 degree magnetometers including integrator and coil drive circuits. The coil pair outputs are provided to associated analog gate circuitry, e.g. multiplexers for inverting the coil outputs prior to integration. Inversion of the coil outputs may be provided since the polarity of the back induced voltage in the coils is opposite to the coil voltage during saturation. To minimize clock noise while maintaining system bandwidth, the coil pairs may be driven by a clocking generator so that the clocks for one coil pair is 180 degrees out of phase with the clock driving other coil pair. When the coil outputs are integrated, and the integrator outputs are summed, the clocks cancel. Also, when using two (or more) torque tensors in an application, it may be advantageous to synchronize the system clocks to reduce the cross-coupled magnetic fields that could result in modulation beat frequencies being produced.

Also, to reduce current consumption by the torque sensor circuit, the duty cycle of the coil clocking signals may be changed from a 50%/50% on/off time to a 25%/75% on/off time. Since keeping the coils driven for any period longer than necessary to reach saturation may waste power (with no signal improvement), the 25%/75% on/off may be a compromise, which may result in a current reduction of approximately 20%. The optimal reduction may be a function of the particular application of the sensor and can be adjusted to meet this requirement.

To provide reliable common mode field cancellation, the fields experienced by the coils may be acquired independently and the outputs of their respective integrators may be matched using a balance control which adds a portion of each integrator output null out the offending common mode signal (the desired differential signals are in phase and the common mode signals are out of phase with each other). This method also may allow the direct accurate measurement of the common mode field by inverting the output of one of the integrators and then summing the outputs (the common mode signal is now in phase and the differential signal is out of phase). This method may also allow shutting down the torque sensor if it experiences a common mode field that approaches the limit of the rejection circuitry (such as may result when a permanent magnet is accidentally placed in the proximity of the sensor coils). Thus, both the common and differential mode signals are available to the application, if desired.

In the illustrated exemplary embodiment 800, the common mode signal is sent to a window comparator which can detect both polarities of common mode signal. The comparator output goes to a low state if the preset levels are exceeded and shuts down the output amplifier.

To provide a torque sensor output that is ratiometric with the supply voltage, precautions may be taken to prevent the loss of any of the supply voltage by any series element. In one embodiment, the power supply may have a "slow start" feature which would prevent current surges from occurring during power application. A circuit utilizing a low "on resistance" MOSFET and time delay elements may be used for this purpose. In such an embodiment, the surge may be reduced to less than a 10% momentary over current.

A system consistent with the present invention may also allow for temperature compensation to account for shafts exhibiting a temperature dependant voltage vs. torque characteristics. In such an embodiment, a compensating correction voltage may be summed with the sensor output to provided a linear output. Diagnostics may also be incorporated. In one embodiment, if a diagnosable event occurs the system may go to the low rail, with the exception of loss of power or ground and loss of reverse and over voltage in which case the system may pull to the remaining active rail. For example a common mode field over limit may be set, whereby if the common mode field is exceeded the output pulls to the lower rail. Opening and shorting of pins may also cause the system to pull to the lower rail.

Figure 9:
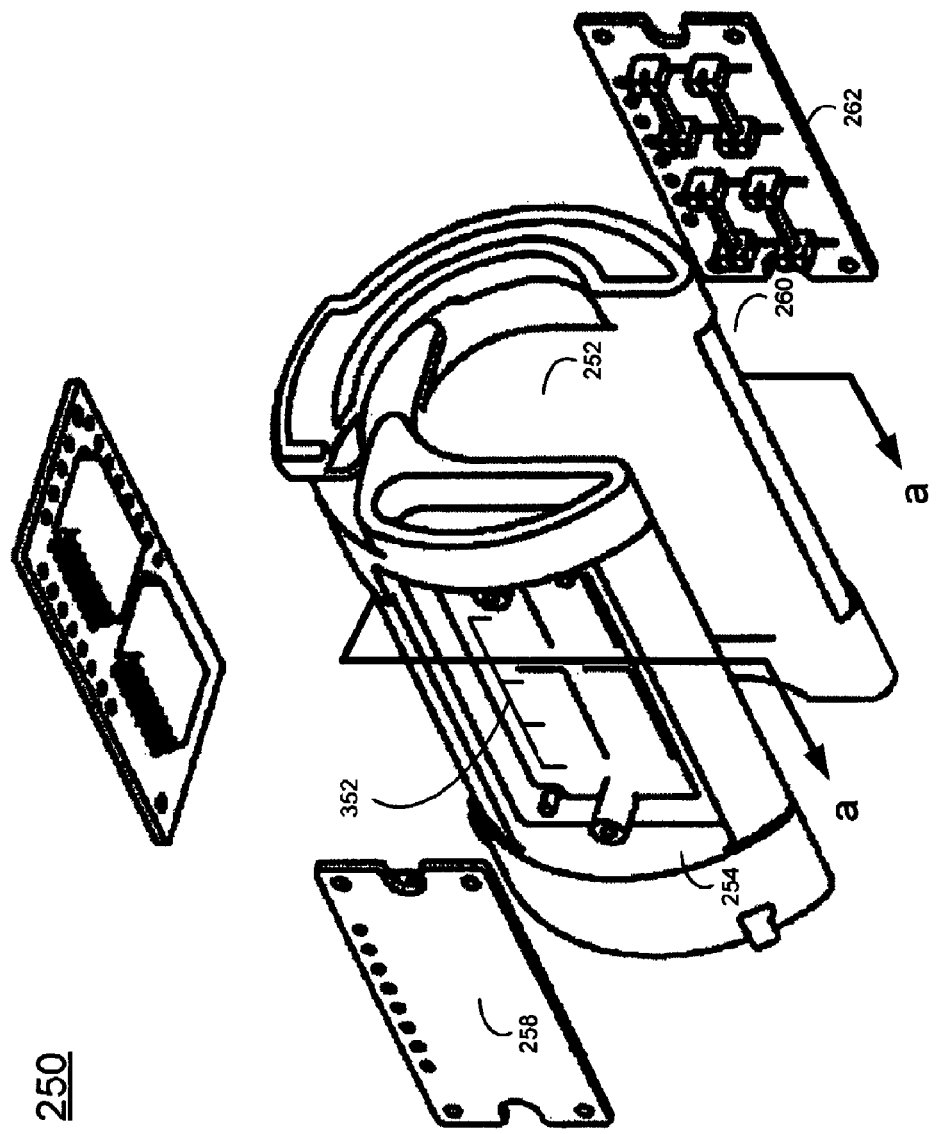
FIG. 9 is an isometric view of a housing assembly for housing the torque sensor assembly of FIG. 1.

Referring to FIG. 9, there is shown a housing assembly 250 that may include a passage 252 (formed in housing assembly 250) that may be configured to receive shaft assembly 12 (FIG. 1). A first recess 254 may be formed in housing assembly 250 and may be configured to receive one or more sensor packages 258. A second recess 260 may be formed in housing assembly 250 and may be configured to receive one or more sensor packages 262. A third recess may be formed in housing assembly 250 and may be configured to receive a circuit board carrying electronics coupled to the sensor packages for receiving an processing outputs from sensor elements on the sensor packages. Magnetic and/or EMC shielding (not shown) may be provided on at least a portion of the housing and/or disposed around and/or protecting at least a portion of the sensing elements. In one such embodiment, the shield may include closed ends. The use of shielding in this manner may reduce outside interference and may, therefore, improve performance of the sensor.

The housing may also include means for fixing the axial and radial positions of the sensor packages to relative to the housing, and for fixing the axial and radial position of the housing to the shaft. In general, the sensor packages 258, 262 may be positioned to achieve axial alignment of the sensor elements relative to the circumferentially magnetized band (s), e.g. as shown in FIGS. 3 and 5. The sensor packages may also be positioned to provide a uniform spacing between the exterior surface of the shaft and the respective sensor elements.

The sensor packages may include multiple sensor elements arranged to establish a desired sensor element orientation for the application. Referring to FIG. 10, for example, sensor packages 258a, 262a may include multiple discrete sensor elements, e.g. flux gates, provided in differential pairs with each pair wound on a single bobbin. For example, in this illustrative embodiment, coil assembly 258a is shown to include four sensor elements 264, 266, 268, 270, with sensor elements 264, 266 sharing a common axis, i.e. wound on a single bobbin, and sensor elements 268, 270 sharing a common axis, i.e. wound on a separate single bobbin. In this particular example, sensor elements 268, 270 may be configured to be redundant with sensor elements 264, 266, in that sensor elements 268, 270 are only used in that event that sensor elements 264, 266 fail.

Additionally, coil assembly 262a is shown to include four sensor elements 272, 274, 276, 278 with sensor elements 272, 274 sharing a common axis and sensor elements 276, 278 sharing a common axis. In this particular example, sensor elements 276, 278 may be configured to be redundant with sensor elements 272, 274, in that sensor elements 276, 278 are only used in the event that sensor elements 272, 274 fail.

Winding a differential pair of flux gates on a single bobbin may be performed, continuously and/or in a singulated manner, on separate coil section of the bobbin. A coil associated with each flux gate sensor element may be provided in reverse direction relative to the other coil to achieve a differentially-summing coil pair. This aspect may provide cost-reduction through a reduction of material and an increased ease of assembly. Furthermore, this fluxgate coil pair design and mode of production may also provide a reduction in the tolerance associated with the relative distance between the two coils.

Figure 11:
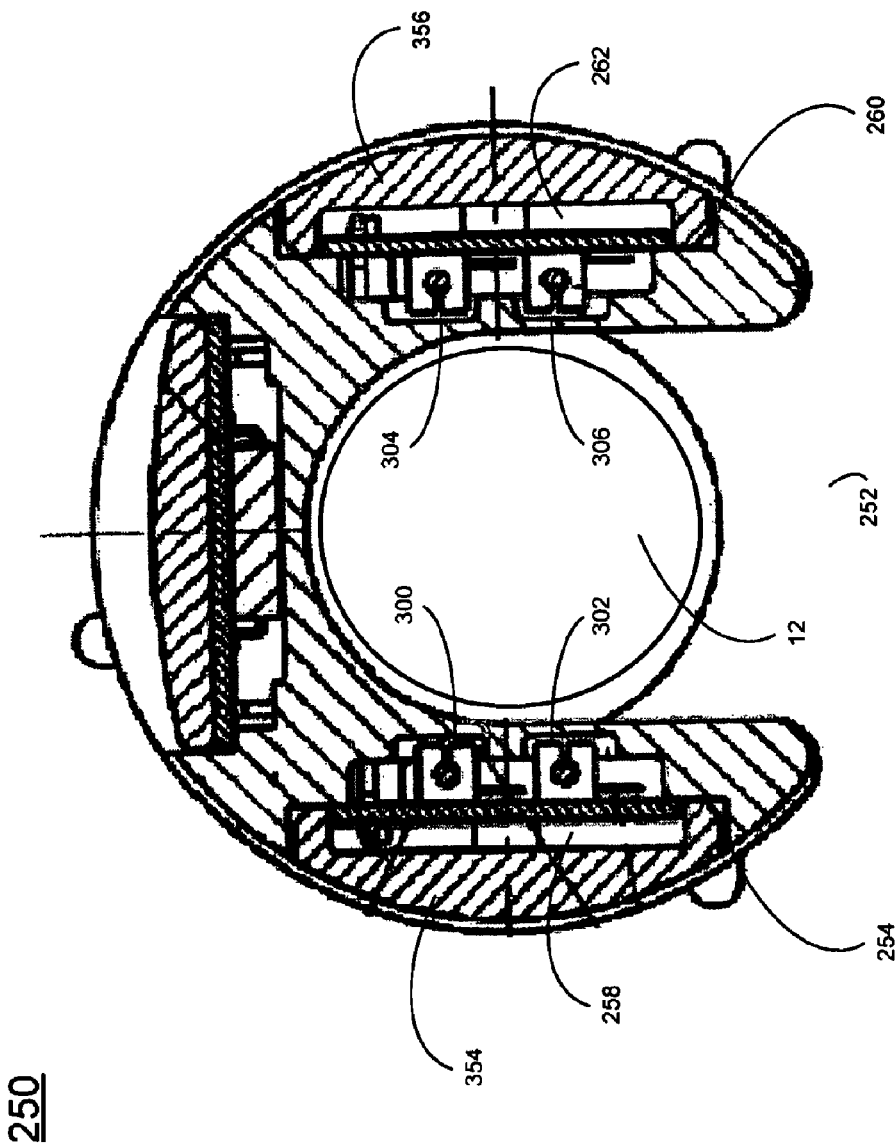
FIG. 11 is a cross-sectional view of the housing assembly of FIG. 9.

Referring also to FIG. 11, there is shown a cross-sectional view of housing 250 (FIG. 9) along section line a-a. Recess 254 may include one or more coil recesses 300, 302 for reducing the radial spacing (i.e., the straight-line distance) between shaft assembly 12 and coil assembly 258. Further, recess 260 may include one or more coil recesses 304, 306 for reducing the radial spacing between shaft assembly 12 and coil assembly 262.

Figure 12:
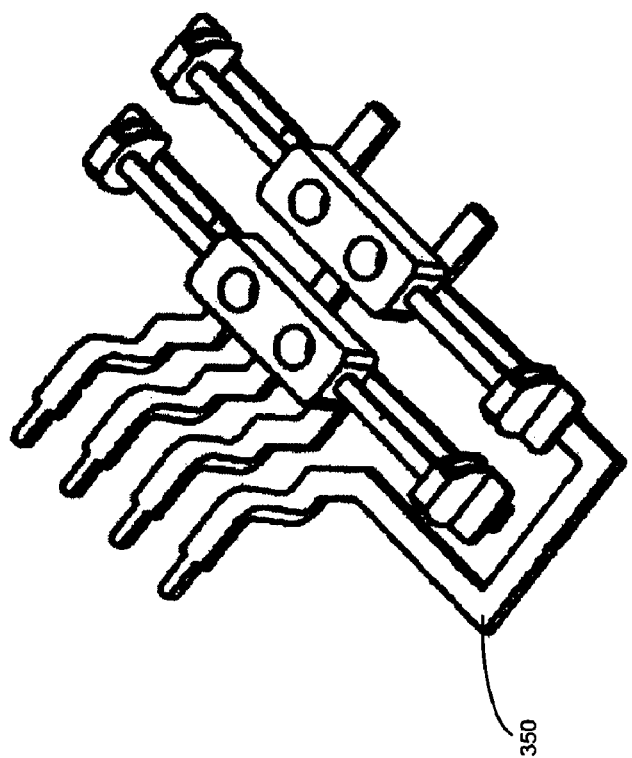
FIG. 12 is an isometric view of a coil assembly for use within the housing assembly of FIG. 9.
Figure 13:
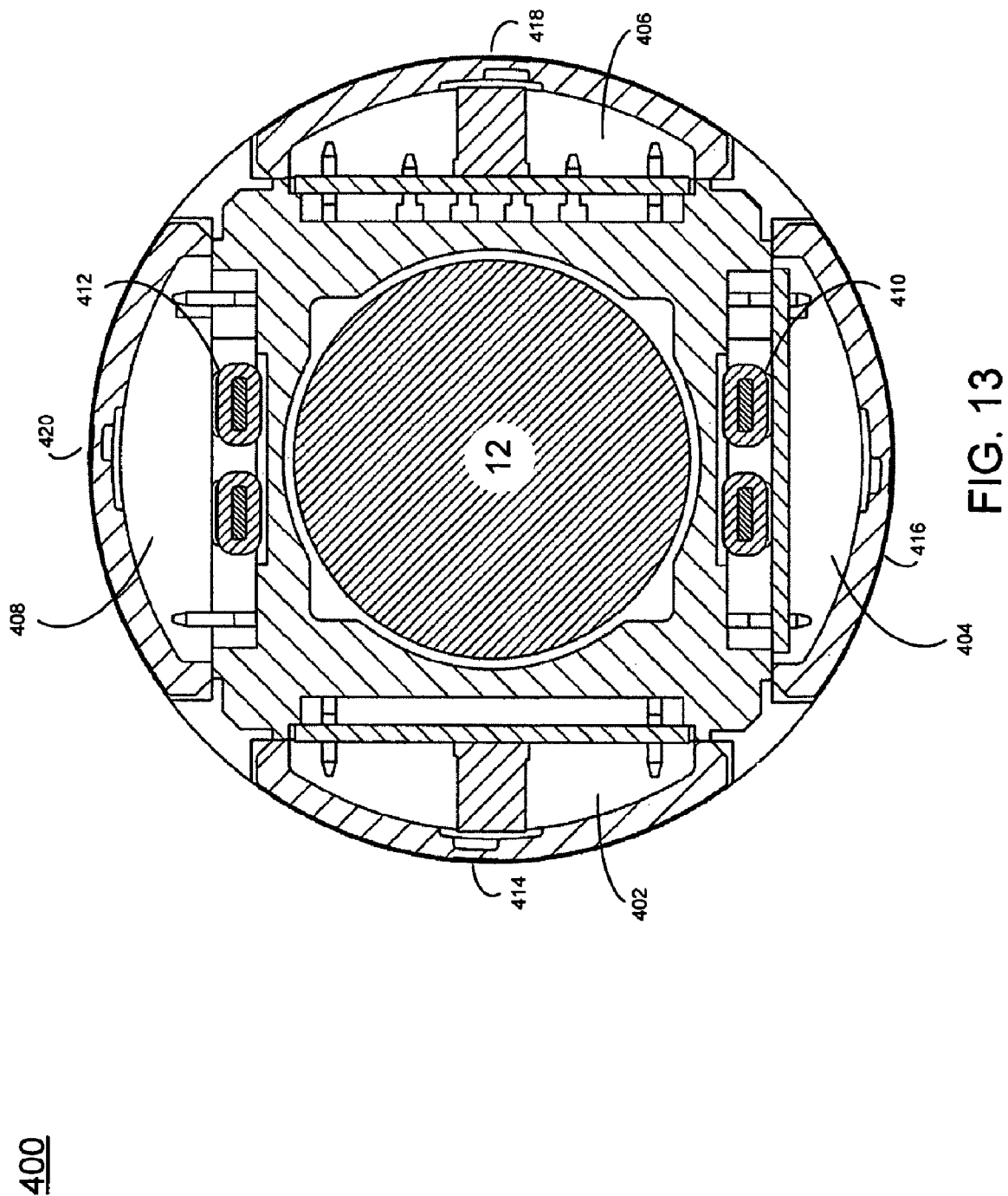
FIG. 13 is a cross-sectional view of an alternative embodiment housing assembly for housing the torque sensor assembly of FIG. 1.
Figure 14:
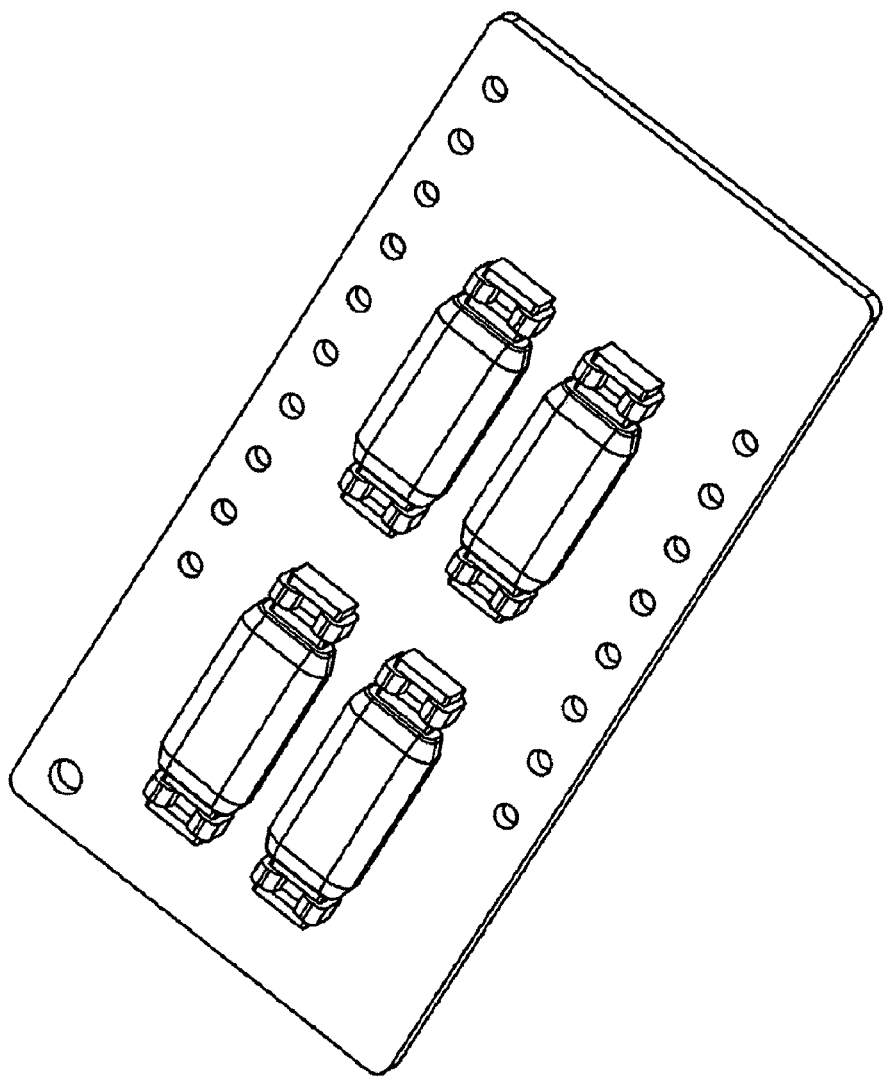
FIG. 14 is an isometric view of a coil assembly for use within the alternative embodiment housing assembly of FIG. 13.
Figure 15:
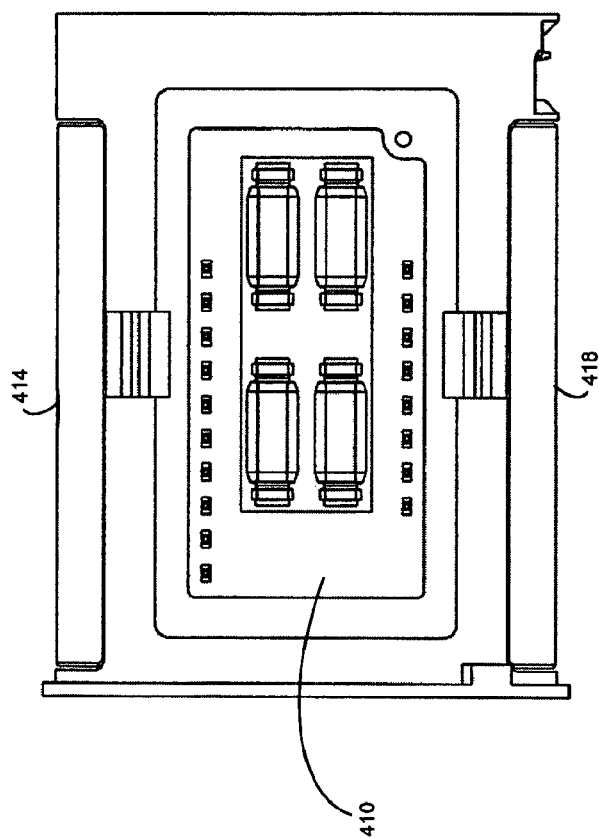
FIG. 15 is a side view of the alternative embodiment housing assembly of FIG. 13 with a cover removed.
Figure 16:
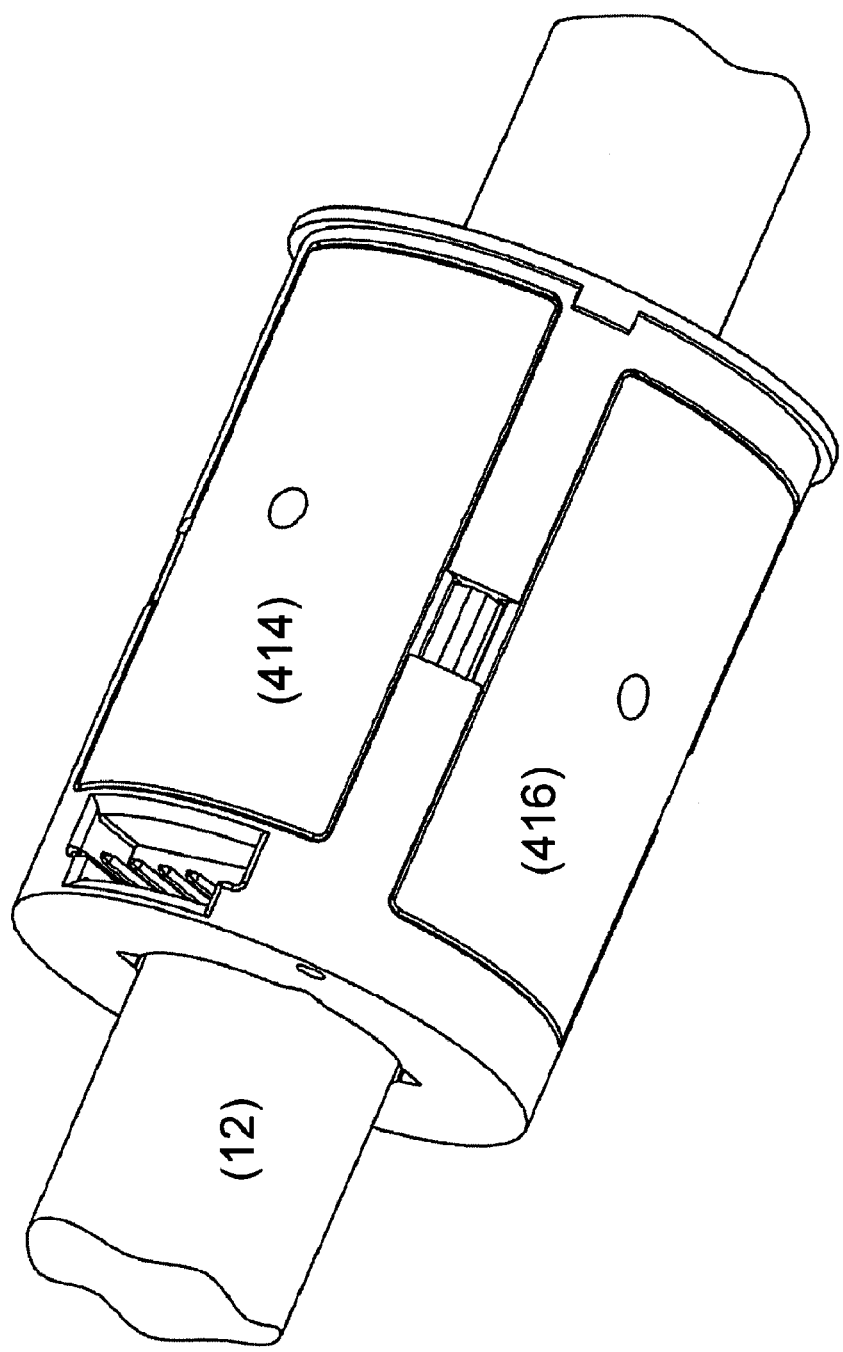
FIG. 16 is an isometric view of a shaft assembly and the alternative embodiment housing assembly of FIG. 13.

Referring also to FIG. 12, coil assembly 258 and/or coil assembly 262 may be constructed on a lead frame (i.e., self-supporting rigid electrical interconnections) 350, thus eliminating the need for PCB (i.e., printed circuit board) mounting of the sensor elements. Lead frame 350 may electrically couple the various coils (e.g., coils 264, 266, 268, 270 of FIG. 10) of coil assembly 258, 262 with various other components of torque sensor assembly 10.

Alternatively and referring again to FIG. 9, recess 254 and/or recess 260 may include one or more conductive ink traces (e.g., conductive ink trace 352) for electrically coupling the various coils (e.g., coils 264, 266, 268, 270 of FIG. 10) of coil assembly 258, 262 with various other components of torque sensor assembly 10. As is known in the art, when using conductive ink traces, the electrical components are rigidly attached (via pins or some other form of fastener, not shown) to the surface that contains the conductive ink traces (e.g., the surface of recess 254).

Referring again to FIG. 11, once coil assembly 258 and/or coil assembly 262 are properly positioned within recesses 254, 260 (respectively) of housing 250, a thermoplastic material 354, 356 (respectively) may be used to fill recesses 254, 260 and encapsulate sensor elements 258, 262.

Referring also to FIGS. 13, 14, 15, 16 & 17, there is shown an alternative embodiment 400 of housing 250 (of FIG. 9). Housing 400 may include four recesses 402, 404, 406, 408 and may be configured to accept a coil assembly in each recess. Housing 400 as illustrated is shown to include two sensor elements, namely coil assembly 410 in recess 404 and coil assembly 412 in recess 408. Each recess 402, 404, 406, 408 may be configured to receive a cover assembly 414, 416, 418, 420 (respectively), which may be releasably coupled to housing 400.

There is thus provided; according to one aspect of this disclosure, a torque sensing assembly including a first sensor assembly configured for: sensing at least a portion of a magnetic field of a first portion of a rotating shaft assembly; and generating a first signal. A second sensor assembly is configured for: sensing at least a portion of a magnetic field of a second portion of the rotating shaft assembly; and generating a second signal. A common mode detection circuit is configured for: combining the first and second signals to form a combined signal; and processing the combined signal to at least partially remove a common mode signal from the combined signal and generate an output signal.

One or more of the following features may also be included. The first sensor assembly may include: one or more sensor elements for generating a first magnetic intensity signal; and an integrator circuit for processing the first magnetic intensity signal to generate the first signal. The first sensor assembly further may include: a rectifying circuit for rectifying the first magnetic intensity signal, which may be provided to the integrator circuit. The rectifying circuit may include a multiplexer.

The second sensor assembly may include: one or more sensor elements for generating a second magnetic intensity signal; and an integrator circuit for processing the second magnetic intensity signal to generate the second signal. The second sensor assembly further may include: a rectifying circuit for rectifying the second magnetic intensity signal, which may be provided to the integrator circuit. The rectifying circuit may include a multiplexer.

The common mode rejection circuit may include: a balancing circuit for balancing the first signal with respect to the second signal and generating the combined signal. A differential amplification circuit, responsive to the first and second signals, may generate a differential signal. An output amplification circuit, responsive to the combined signal and the differential signal, may amplify the combined signal to generate the output signal.

A power supply may be configured to provide a power signal to at least a portion of at least one of the first and second inductive assemblies. A soft-start controller may be configured to energize the power supply during a defined time period. The power signal may be a variable duty-cycle power signal and the power supply may be configured to regulate the duty-cycle of the variable duty-cycle power signal. The defined time period may be defined by an RC time constant.

The first sensor assembly may include: a first sensor element coupled in a series configuration to a second sensor element. The first and second sensor elements may be radially diametrically-opposed about the rotating shaft. At least one of the first and second sensor elements may include a flux gate sensor.

The second sensor assembly may include: a first sensor element coupled in a series configuration to a second sensor element. The first and second sensor elements may be radially diametrically-opposed about the rotating shaft. At least one of the first and second sensor elements may include a flux gate sensor.

According to another aspect of this disclosure, there is provided a method including sensing at least a portion of a magnetic field of a first portion of a rotating shaft assembly and generating a first signal. At least a portion of a magnetic field of a second portion of the rotating shaft assembly is sensed and a second signal is generated. The first and second signals are combined to form a combined signal, which is processed to at least partially remove a common mode signal from the combined signal and generate an output signal.

One or more of the following features may also be included. Sensing at least a portion of a magnetic field of a first portion of a rotating shaft assembly may include: generating a first magnetic intensity signal; and processing the first magnetic intensity signal to generate the first signal. Sensing at least a portion of a magnetic field of a first portion of a rotating shaft assembly may further include: rectifying the first magnetic intensity signal.

Sensing at least a portion of a magnetic field of a second portion of the rotating shaft assembly may include: generating a second magnetic intensity signal; and processing the second magnetic intensity signal to generate the second signal. Sensing at least a portion of a magnetic field of a second portion of the rotating shaft assembly may further include: rectifying the second magnetic intensity signal.

Combining the first and second signals to form a combined signal may include: balancing the first signal with respect to the second signal to generate the combined signal; generating a differential signal based upon the first and second signals; and amplifying the combined signal, based upon the differential signal, to generate the output signal circuit.

A power signal may be provided to at least a portion of at least one of the first and second inductive assemblies. The power supply may be energized during a defined time period. The power signal may be a variable duty-cycle power signal. The duty-cycle of the variable duty-cycle power signal may be regulated. The defined time period may be defined by an RC time constant.

According to another aspect of this disclosure, there is provided a housing assembly including a passage formed in the housing assembly and configured to receive a shaft assembly. A first recess is formed in the housing assembly and configured to receive at least a portion of a first sensor element. The first sensor element includes at least a first and a second flux gate. A second recess is formed in the housing assembly and configured to receive at least a portion of a second sensor element.

One or more of the following features may also be included. The first recess may include at least one coil recess for reducing a radial spacing between the shaft assembly and at least one of the first and second flux gates. The second recess may include at least one coil recess for reducing a radial spacing between the shaft assembly and at least one of the first and second flux gates.

The first sensor element may include a lead frame for electrically coupling the first and second flux gates of the first sensor element. The second sensor element may include a lead frame for electrically coupling the first and second flux gates of the second sensor element.

A surface of the first recess may include at least one conductive ink trace for electrically coupling the first and second flux gates of the first sensor element. A surface of the second recess may include at least one conductive ink trace for electrically coupling the first and second flux gates of the second sensor element.

The first recess may be configured to receive a thermoplastic material to encapsulate the first sensor element within the first recess. The second recess may be configured to receive a thermoplastic material to encapsulate the second sensor element within the second recess.

At least one of the first and second flux gates of the first sensor element may include a flux gate sensor. At least one of the first and second flux gates of the second sensor element may include a flux gate sensor.

A number of implementations have been described. Nevertheless, it will be understood that various modifications may be made. For example, exemplary embodiments have been described herein as including two circumferentially magnetized bands and four sensor elements, e.g. arranged in two differential pairs. It is to be understood, however, that a system consistent with the present invention may include any one or more circumferentially magnetized bands and one or more sensor elements, e.g. one band with two coils, two bands with two coils, one band with one coil, etc., depending on the application. Accordingly, other implementations are within the scope of the following claims.

What is claimed is:
1. A torque sensing assembly comprising:
   a first sensor assembly comprising one or more sensor elements for generating a first magnetic intensity signal and a first integrator circuit for processing the first magnetic intensity signal to generate a first signal;
   a second sensor assembly comprising one or more sensor elements for generating a second magnetic intensity signal and a second integrator circuit for processing the second magnetic intensity signal to generate a second signal; and
   a common mode detection circuit comprising a balancing circuit for receiving said first signal and said second signal and balancing said first signal with respect to said second signal by combining a portion of said first signal and a portion of said second signal to generate a combined signal and at least partially remove common mode signals from said first and second signals.
2. The assembly of claim 1 wherein the first sensor assembly further includes:
   a rectifying circuit for rectifying the first magnetic intensity signal, which is provided to the first integrator circuit.

3. The assembly of claim 2 wherein the rectifying circuit includes a multiplexer.

4. The assembly of claim 1 wherein the second sensor assembly further includes:
a rectifying circuit for rectifying the second magnetic intensity signal, which is provided to the second integrator circuit.

5. The assembly of claim 4 wherein the rectifying circuit includes a multiplexer.

6. The assembly of claim 1 wherein the common mode rejection circuit includes:
a differential amplification circuit, responsive to the first and second signals, for generating a differential signal; and
an output amplification circuit, responsive to the combined signal and the differential signal, for amplifying the combined signal to generate the output signal.

7. The assembly of claim 1 further comprising:
a power supply configured to provide a power signal to at least a portion of at least one of the first and second sensor assemblies; and
a soft-start controller configured to energize the power supply during a defined time period.

8. The assembly of claim 7 wherein the power signal is a variable duty-cycle power signal and the power supply is configured to regulate the duty-cycle of the variable duty-cycle power signal.

9. The assembly of claim 7 wherein the defined time period is defined by an RC time constant.

10. The assembly of claim 1 wherein the first sensor assembly includes:
a first sensor element coupled in a series configuration to a second sensor element, wherein the first and second sensor elements are radially diametrically-opposed about the rotating shaft.

11. The assembly of claim 1 wherein the second sensor assembly includes:
a first sensor element coupled in a series configuration to a second sensor element, wherein the first and second sensor elements are radially diametrically-opposed about the said shaft.

12. A method comprising:
sensing at least a portion of a magnetic field of a first portion of a rotating shaft assembly and generating a first signal;
sensing at least a portion of a magnetic field of a second portion of the rotating shaft assembly and generating a second signal; and
receiving said first signal and said second signal using a common mode detection circuit comprising a balancing circuit for balancing said first signal with respect to said second signal by combining a portion of said first signal and a portion of said second signal to generate a combined signal and at least partially remove common mode signals from said first and second signals.

13. The method of claim 12 wherein sensing at least a portion of a magnetic field of a first portion of a rotating shaft assembly includes:
generating a first magnetic intensity signal; and
processing the first magnetic intensity signal to generate the first signal.

14. The method of claim 13 wherein sensing at least a portion of a magnetic field of a first portion of a rotating shaft assembly further includes:
rectifying the first magnetic intensity signal.

15. The method of claim 12 wherein sensing at least a portion of a magnetic field of a second portion of the rotating shaft assembly includes:
generating a second magnetic intensity signal; and
processing the second magnetic intensity signal to generate the second signal.

16. The method of claim 15 wherein sensing at least a portion of a magnetic field of a second portion of the rotating shaft assembly further includes:
rectifying the second magnetic intensity signal.

17. The method of claim 12 wherein combining the first and second signals to form a combined signal includes:
generating a differential signal based upon the first and second signals; and
amplifying the combined signal, based upon the differential signal, to generate the output signal circuit.

18. The method of claim 12 further comprising:
providing a power signal to at least a portion of at least one of the first and second inductive assemblies; and
energizing the power supply during a defined time period.

19. The method of claim 18 wherein the power signal is a variable duty-cycle power signal, the method further comprising:
regulating the duty-cycle of the variable duty-cycle power signal.

20. The method of claim 18 wherein the defined time period is defined by an RC time constant.

* * * * *